May 19, 1925.
J. P. LORENZ
TAPPET VALVE
Filed April 20, 1923
1,538,126
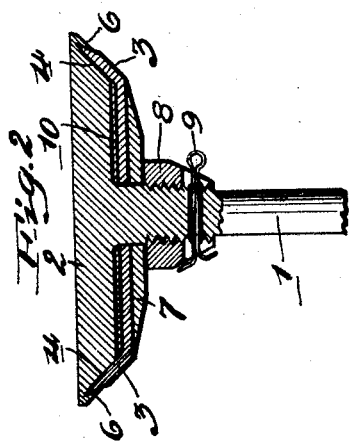
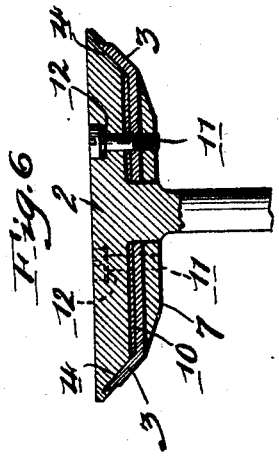
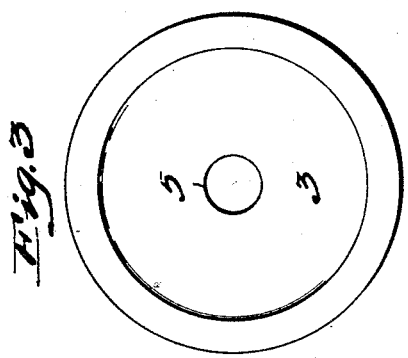
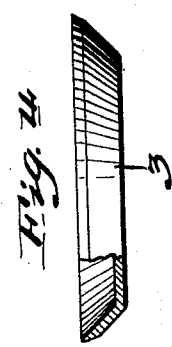
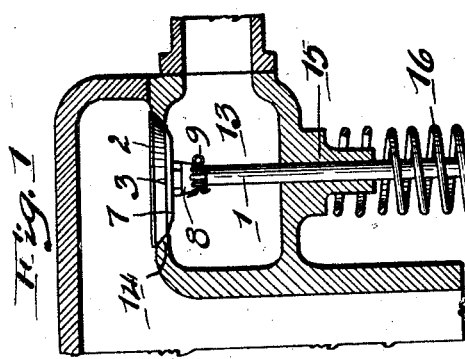
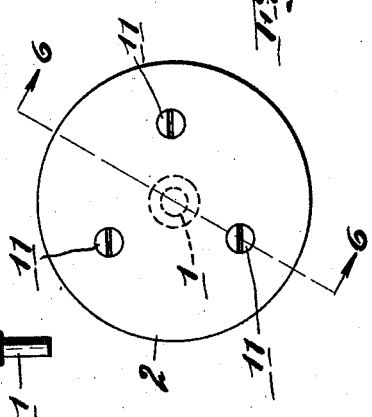
Inventor
John P. Lorenz
By John E. Stryker
His Attorney Patented May 19, 1925.

1,538,126

UNITED STATES PATENT OFFICE.

JOHN P. LORENZ, OF ST. PAUL, MINNESOTA.

TAPPET VALVE.

Application filed April 20, 1923. Serial No. 633,456.

*To all whom it may concern:*

Be it known that I, JOHN P. LORENZ, a citizen of the United States, residing at St. Paul, in the county of Ramsey and State of Minnesota, have invented new and useful Improvements in Tappet Valves, of which the following is a specification.

Heretofore, the valves of internal combustion engines have been so constructed that much time and energy has been necessarily expended in repeated grinding of the valves to fit the cylinder ports, and as is well known, the irksomeness of this work frequently results in improperly seated valves and leaky cylinders. It is also a matter of common knowledge that the valves and guides therefor sometimes become warped by heat so that it is practically impossible to grind them to fit the ports and the valves must be replaced by new ones. The steel valves in common use are also objectionable because of the noise produced thereby when in operation.

It is the object of this invention to provide a valve which is unusually silent in operation and so constructed that the bearing surface adjusts itself to its seat in the cylinder port and requires no grinding.

It is also my object to provide a valve with an easily removable bearing made of soft metal to which carbon does not readily adhere.

A further object is to so form the head of a tappet valve that the soft metal bearing is prevented from being distorted or spread under the constant pounding against the valve seat when in operation.

My invention also includes novel features of construction which will be more fully pointed out in the following specification and claims.

Referring to the accompanying drawings, Figure 1 is a side elevation of my improved valve mounted in a cylinder port of common type; Figure 2 is an enlarged central vertical section through the valve head; Figure 3 is a plan view of the detachable bearing for the valve; Figure 4 is a side elevation of the same partially in section; Figure 5 is a plan view of the valve with an alternate form of means for securing the bearing to the valve head; and Figure 6 is a section taken on the line 6—6 of Figure 5.

My improved valve is formed with the usual stem 1 and a disc-like head 2 made of suitable steel. A cup-shaped bearing 3 is arranged to fit and cover the beveled surface 4 on the head 2, the stem 1 being inserted through a central perforation 5 in the bearing 3. The periphery of the head 2 is formed with an annular flange 6 which surrounds the bearing 3 to prevent said bearing from being distorted, as hereinafter described. Disposed on the normally lower surface of the bearing 3 is a removable retaining disc 7, which is adapted to be pressed upon said bearing by a nut 8 threaded on the stem 1. Rotation of the nut 8, when in place on the stem 1 is prevented by a cotter pin 9 inserted through a perforation in said stem and through suitable curfs in the nut 8. To prevent leakage between the head 2 and bearing 3, I place a suitable gasket 10 between the surfaces thereof.

The angle between the beveled surface 4 on the head 2 and the axis of the stem 1 is preferably made slightly greater than the angle between the adjacent beveled face of the bearing 3 and the axis of said stem so that the periphery of the cup 3 will be forced into engagement with the flange 6 under the action of the nut 8. Thus, the angle between the surface 4 and valve stem may be 46 degrees while the angle of the adjacent surface of the bearing 3 is 45 degrees.

An alternate form of means for securing the bearing 3 to the head 2 is shown in Figures 5 and 6. In this form, a series of screws 11 extend through the head 2 and are threaded in the retaining disc 7, suitable spring washers 12 being provided to prevent the screws from loosening.

Copper is a desirable soft metal from which to construct the bearing 3 because this metal is extremely malleable and will, when the valve is in operation quickly shape itself so as to closely conform to the valve seat.

In use, the valve is arranged to close a cylinder port 13 (Fig. 1), a beveled seat 14 being formed in said port for engagement with the bearing 3. The stem 1 extends downward through a suitable guide 15, and the lower end of said stem is fitted with a spring 16 adapted to normally maintain the valve in closed position.

In operation, the stem 1 is actuated in the usual manner to open and close the port 13. To mount the valve in the port, no grinding is required and it is only necessary to tap the head 2 of the valve, while it is in position on its seat 14, to firmly press the bearing 3 into engagement with the flange 6. If the guide 15 is not in exact axial alignment with the seat 14 the bearing 3, being of a soft malleable metal, will shift sufficiently during the operation of the valve to conform to and closely fit the seat, thus preventing leakage past the valve. I have found that in practice carbon will not collect in injurious quantities on the valve seat 14 or on the bearing 3 and the seat remains bright and clean after long use, because the soft bearing 3 does not press unconsumed carbon into the cast iron seat 14 with sufficient force to form pits or indentations therein and the carbon has no tendency to stick to the valve bearing 3, so that any carbon that lodges on said bearing is blown away by the passing fuel or burnt gases. After use for a short time, the heat of combustion in the engine hardens the surface of the copper bearing 3 so that wear is not rapid. When injurious wear does occur after long use, the bearing 3 may be quickly removed and replaced by merely removing the valve from the cylinder and unscrewing the nut 8 of the preferred embodiment, or the screws 11 of the alternate form.

It will be noted that the steel flange 6 on the valve head completely surrounds the outer periphery of the soft metal bearing 3 where said bearing would otherwise have a tendency to spread and escape from the impinging seat 14.

Having described my invention what I claim as new and desire to protect by Letters Patent is:

1. In a valve having a stem and a beveled head on said stem, a bearing adapted to cover the beveled surface of said head and a flange formed on said head to surround and engage the outer edge of said bearing.

2. In a valve having a stem and a beveled head on said stem, a bearing adapted to be mounted over the beveled surface of said head, a flange formed on said head to surround and engage the outer edge of said bearing, and a retaining disc adapted to hold said bearing on said head.

3. In a valve having a stem and a beveled head on said stem, a bearing adapted to cover the beveled surface of said head, means arranged on said head to surround and confine the periphery of said bearing at the outer edge thereof, and means for securing said bearing to said head.

4. In a valve having a stem and a beveled steel head on said stem, a removable copper bearing adapted to cover the beveled surface of said head and means arranged on said head to surround and confine the periphery of said bearing.

5. In a valve having a stem and a beveled head on said stem, a removable cup shaped bearing adapted to cover the beveled surface of said head and having a perforation arranged to receive said stem, means on said head adapted to engage the normally upper periphery of said bearing, a retaining disc mounted around said stem adjacent to said bearing, and a nut threaded on said stem to impinge against said disc.

6. In a valve having a stem and a head on said stem, a malleable bearing having its surface for engagement with a valve seat in the form of a truncated cone, said bearing being removably mounted on the valve, and an annular projection arranged at the base of said cone to prevent said bearing from spreading.

7. In a valve having a stem and a head on said stem, a malleable bearing having its surface for engagement with a valve seat in the form of a truncated cone and an annular projection arranged at the base of said cone to prevent said bearing from spreading.

In testimony whereof, I have hereunto signed my name to this specification.

JOHN P. LORENZ